United States Patent
Cho et al.

(10) Patent No.: US 7,678,491 B2
(45) Date of Patent: Mar. 16, 2010

(54) STACK AND FUEL CELL SYSTEM USING THE SAME

(75) Inventors: Eun Suk Cho, Yongin (KR); Jun Won Suh, Yongin (KR); Jong Ki Lee, Yongin (KR); Ri A Ju, Yongin (KR); Won Hyouk Jang, Yongin (KR); Dong Yun Lee, Yongin (KR); Sang Hyeon Choi, Yongin (KR); Jin Hong An, Yongin (KR)

(73) Assignee: Samsung SDI Co., Ltd., Suwon-si (KR)

( * ) Notice: Subject to any disclaimer, the term of this patent is extended or adjusted under 35 U.S.C. 154(b) by 1034 days.

(21) Appl. No.: 11/371,683

(22) Filed: Mar. 8, 2006

(65) Prior Publication Data

US 2006/0204820 A1    Sep. 14, 2006

(30) Foreign Application Priority Data

Mar. 10, 2005    (KR)    ............ 10-2005-0019941

(51) Int. Cl.
*H01M 2/14*    (2006.01)
(52) U.S. Cl. .......................................... 429/38
(58) Field of Classification Search ............ 429/34, 429/38
See application file for complete search history.

(56) References Cited

U.S. PATENT DOCUMENTS

| | | | | |
|---|---|---|---|---|
| 4,585,708 A | * | 4/1986 | Abens et al. | ............ 429/17 |
| 4,719,157 A | * | 1/1988 | Tsutsumi et al. | ............ 429/34 |
| 6,764,786 B2 | * | 7/2004 | Morrow et al. | ............ 429/37 |

FOREIGN PATENT DOCUMENTS

| | | |
|---|---|---|
| JP | 2000-164234 | 6/2000 |
| JP | 2000-357531 | * 12/2000 |
| JP | 2001-223018 | 8/2001 |

(Continued)

OTHER PUBLICATIONS

SIPO Patent Gazette dated Nov. 12, 2008, for corresponding Chinese application 2006/0054796.4 noting listing references in this IDS.

(Continued)

*Primary Examiner*—Patrick Ryan
*Assistant Examiner*—Thomas H. Parsons
(74) *Attorney, Agent, or Firm*—Christie, Parker & Hale, LLP

(57) ABSTRACT

A stack for a fuel cell includes a first collecting plate having a first electric polarity, a second collecting plate having a second electric polarity different from the first electric polarity, and at least one electricity generator located between the collecting plates. The at least one electricity generator is for generating electric energy due to electrochemical reaction between hydrogen and oxygen to be collected by the collecting plates. Coupling members press the at least one electricity generator in an airtight connection between the collecting plates. A terminal member protrudes from the second collecting plate and is electrically connected to the first collecting plate and insulated from the second collecting plate, such that the terminal member is used as a first terminal having the first polarity. The second collecting plate or a second terminal member may also be used as a second terminal having the second polarity.

36 Claims, 9 Drawing Sheets

FOREIGN PATENT DOCUMENTS

| | | |
|---|---|---|
| JP | 2002-362165 | 12/2002 |
| JP | 2005-005077 | 1/2005 |
| WO | WO 2005/018025 A1 | 2/2005 |

OTHER PUBLICATIONS

Patent Abstracts of Japan, Publication No. 2000-164234; Publication Date: Jun. 16, 2000; in the name of So et al.

Patent Abstracts of Japan, Publication No. 2000-357531, dated Dec. 26, 2000, in the name of Yasullito Tanaka.

Patent Abstracts of Japan, Publication No. 2002-362165, dated Dec. 18, 2002, in the name of Hiroaki Saikai.

Japanese Office action dated Sep. 15, 2009, for corresponding Japanese application 2006-061296, noting listed reference in this IDS, as well as JP 2000-357531 previously filed in an IDS dated Sep. 11, 2006 and cited in the U.S. Office action of Jun. 11, 2009.

* cited by examiner

STACK AND FUEL CELL SYSTEM USING THE SAME

CROSS-REFERENCE TO RELATED APPLICATIONS

This application claims priority to and the benefit of Korean Patent Application No. 10-2005-0019941, filed on Mar. 10, 2005, in the Korean Intellectual Property Office, the entire content of which is incorporated herein by reference.

BACKGROUND

1. Field of the Invention

The present invention relates to a fuel cell system, and more particularly, to a fuel cell system having an improved stack structure.

2. Discussion of Related Art

A fuel cell directly transforms chemical reaction energy obtained by reacting oxygen with hydrogen contained in a hydro-carbonaceous material such as methanol, ethanol, natural gas, etc., into electric energy. Fuel cells can be classified as a high temperature fuel cell or a low temperature fuel cell.

Here, the low temperature fuel cell may include a polymer electrolyte membrane fuel cell (PEMFC), a direct liquid feed fuel cell (DLFC), etc. A DLFC employing methanol as fuel is called a direct methanol fuel cell (DMFC).

Among these fuel cells, the PEMFC has advantages as compared with other fuel cells in that its output performance is excellent; operation temperature is low; and start and response are quickly performed. Therefore, the PEMFC can be widely used as a portable power source for an automobile, a distributed power source for a house and public places, a micro power source for electronic devices, etc.

The PEMFC includes a stack, a reformer, a fuel tank, a fuel pump, an air pump, etc. The stack is formed by an electricity generating assembly including a plurality of unit cells, and the fuel pump supplies fuel from the fuel tank to the reformer. The reformer reforms the fuel to generate hydrogen gas, and supplies the hydrogen gas to the stack. Then, the stack causes the hydrogen gas to electrochemically react with the oxygen gas of air, thereby generating electrical energy.

The DMFC has the same structure as the PEMFC, but directly employs liquid methanol instead of the hydrogen gas as a reaction fuel. The DMFC can thus be manufactured having a small size because peripheral devices such as the reformer are not needed. Storage and treatment of fuel is simplified, and the DMFC can be applied to nonpolluting vehicles, residential power systems, mobile communication devices, medical devices, military equipment, aerospace industrial equipment, etc., because it operates at normal temperatures.

In such a fuel cell system, the stack substantially generating electricity has a structure including several or dozens of unit cells which each include a membrane electrode assembly (MEA) and a separator. The separator is generally called a bipolar plate by those skilled in the art. The MEA has a structure that an anode and a cathode are attached leaving an electrolyte membrane therebetween. Further, the separator is placed in opposite sides of the MEA, and employed as not only a passage for supplying fuel gas and the oxygen gas needed for reaction of the fuel cell, but also a conductor to electrically connect the anode and the cathode of each MEA in series.

Therefore, the separator allows the fuel gas containing hydrogen to be supplied to the anode while the oxygen gas containing oxygen is supplied to the cathode.

Therefore, the fuel gas containing hydrogen and the oxygen gas containing oxygen are supplied to the anode and the cathode through the separator, respectively. In this process, the fuel gas is electrochemically oxidized in the anode, and the oxygen gas is electrochemically reduced in the cathode, so that electrical energy is generated by the movement of electrons, concomitantly generating heat and water.

The conventional fuel cell allowing the electrons to be movable has been disclosed in Japanese Patent Publication No. 2000-164234. In this fuel cell, the unit cells are connected using separate terminals so that the electric energy is generated having predetermined electric potential.

However, in the conventional fuel cell, the terminals protrude from opposite sides of the stack, so that the stack becomes bulky. Further, wiring connecting the terminals causes the size of the fuel cell to become large.

Thus, the foregoing problems discourage the application of the fuel cell to small devices such as a notebook computer, a portable digital video disc (DVD) player, a personal digital assistant (PDA), a cellular phone, a camcorder, etc.

SUMMARY OF THE INVENTION

In one embodiment of the present invention, a fuel cell system is provided in which a terminal is provided on only one side of the stack to facilitate wiring, and an electric connection structure is improved to thereby enhance the performance of a fuel cell.

In another embodiment of a fuel cell system, the volume of the stack decreases to reduce the size of a fuel cell, thereby making the fuel cell system compact.

The foregoing and/or other aspects of the present invention are achieved by various embodiments that a stack for a fuel cell includes a first collecting plate having a first electric polarity, a second collecting plate having a second electric polarity different from the first electric polarity, and at least one electricity generator located between the collecting plates. The at least one electricity generator is for generating electric energy due to electrochemical reaction between hydrogen and oxygen to be collected by the first collecting plate and the second collecting plate. Coupling members press the at least one electricity generator in an airtight connection between the collecting plates. A terminal member protrudes from the second collecting plate and is electrically connected to the first collecting plate and insulated from the second collecting plate, such that the terminal member is used as a first terminal having the first polarity. A second terminal is located on a same side of the stack as the first terminal and has the second electric polarity. The second collecting plate may also be used as the second terminal.

According to an aspect of the invention, the terminal member comprises one of the coupling members.

According to an aspect of the invention, the terminal member is integrally formed on the first collecting plate, and is coupled to edges of a coupling hole formed in the second collecting plate with an insulating film coating interposed therebetween.

According to an aspect of the invention, the terminal member is coupled to an edge of a coupling hole in the first collecting plate and an edge of a coupling hole in the second collecting plate, and an insulating film coating is interposed between the terminal member and the edge of the coupling hole in the second collecting plate.

According to an aspect of the invention, the stack also includes an insulating member interposed between the terminal member and the second collecting plate.

According to an aspect of the invention, the coupling member is provided on an outside of the at least one electricity generator to directly couple the first collecting plate with the second collecting plate. In this case, the terminal member penetrates the at least one electricity generator and is coated with an insulating film in the portion thereof penetrating the at least one electricity generator.

According to an aspect of the invention, the coupling members comprise a bolt and a nut.

According to an aspect of the invention, either or both of the collecting plates include an aluminum material coated with one material selected from the group consisting of gold, silver and copper.

According to an aspect of the invention, a screw is fastened to the second collecting plate and a wiring line is connected to the screw, such that the second collecting plate functions as an external terminal.

According to an aspect of the invention, the stack further comprises a second terminal member electrically connected to the second collecting plate and insulated from the first collecting plate. The second terminal member protrudes from the second collecting plate and the second terminal member is used as the second terminal.

According to an aspect of the invention, the second terminal member comprises one of the coupling members, and the coupling members comprise a bolt and a nut.

Another aspect of the present invention can be achieved by providing a fuel cell system including a stack for generating electric energy due to electrochemical reaction between hydrogen and oxygen, and a fuel feeder to supply fuel containing hydrogen to the stack. Also included are fuel supplying and discharging pipes adapted to supply the fuel to the at least one electricity generator through the fuel feeder, and to discharge the fuel incompletely reacted in the stack, an oxygen feeder adapted to supply an oxidizing agent containing oxygen to the stack, and oxidizing agent supplying and discharging pipes adapted to supply and discharge an oxidizing agent to the electricity generator through the oxygen feeder. The stack is similar to that described above.

According to an aspect of the invention, the fuel feeder is placed between a fuel tank and the at least one electricity generator, receives the fuel from the fuel tank to generate hydrogen gas, and comprises a reformer to supply the hydrogen gas to the at least one electricity generator.

BRIEF DESCRIPTION OF THE DRAWINGS

These and/or other aspects and features of the invention will become apparent and more readily appreciated from the following description of examples of embodiments, taken in conjunction with the accompanying drawings of which.

DETAILED DESCRIPTION

Hereinafter, examples of embodiments according to the present invention will be described with reference to the accompanying drawings.

Figure 1:
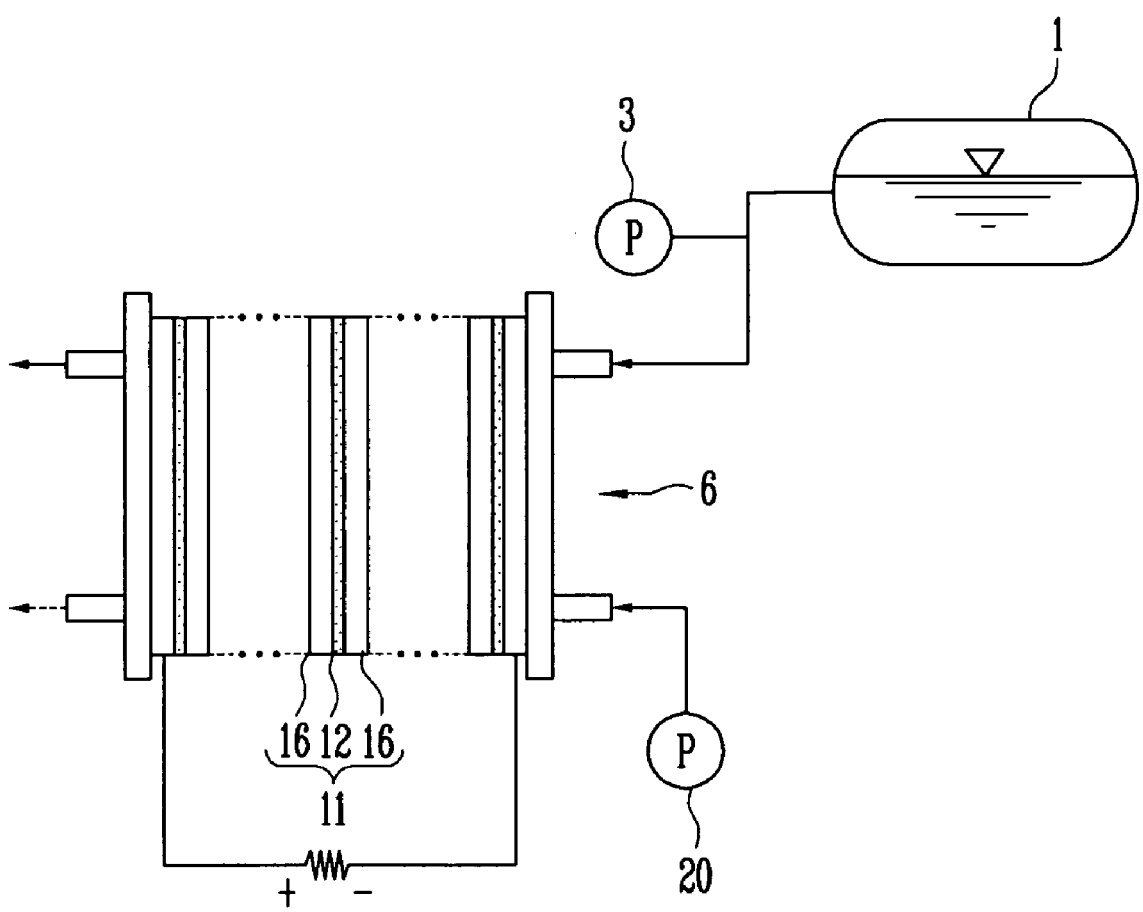
FIG. 1 is a block diagram schematically illustrating a fuel cell system according to an embodiment of the present invention.

FIG. 1 is a block diagram schematically illustrating a fuel cell system according to an embodiment of the present invention.

Referring to FIG. 1, a fuel cell according to an embodiment of the present invention employs a direct methanol fuel cell (DMFC) that directly supplies fuel to a stack so as to generate electricity.

In the foregoing fuel cell system, methanol is used as the fuel for generating the electricity.

Further, either of pure oxygen gas stored in a separate storage or oxygen in air can be used as oxygen to react with hydrogen. Hereinafter, the latter will be described representatively.

According to an embodiment of the present invention, the fuel cell system includes at least one electricity generator 11 to generate electricity using an electrochemical reaction between hydrogen and oxygen, a fuel feeder to feed the electricity generator 11 with the fuel, and an oxygen feeder to feed the electricity generator 11 with oxygen.

The electricity generator 11 is connected to the fuel feeder and receives the methanol from the fuel feeder. Further, the electricity generator 11 receives oxygen from the oxygen feeder. Here, the electricity generator 11 is used as an elementary unit of the fuel cell for allowing hydrogen in the methanol to react with oxygen, and for generating the electricity. The electricity generator 11 can include a membrane electrode assembly (MEA) 12, and a separator 16, which is generally called a bipolar plate by those skilled in the art. Here, the separator is placed on opposite sides of the MEA. Thus, a plurality of electricity generators 11 arranged serially is formed as a stack 6.

The fuel feeder includes a first tank 1 to store liquid fuel, and a fuel pump 3 connected to the first tank 1.

Further, the oxygen feeder includes an air pump 20 to intake air and supply the air to the electricity generator 11.

In the fuel cell system with this configuration, when the fuel from the fuel pump 3 and the air from the air pump 20 are supplied to the electricity generator 11, the electricity generator 11 allows hydrogen in the fuel to electrochemically react with oxygen in the air, thereby generating electricity, water and heat.

The DMFC can further include a recycle tank (not shown) to recycle the fuel incompletely reacted in the stack, and a mixing tank (not shown) to mix high concentration fuel of the first tank 1 with low concentration fuel of the recycle tank.

Alternatively, the fuel cell system according to an embodiment of the present invention may employ a polymer electrode membrane fuel cell (PEMFC) that reforms fuel containing hydrogen to generate hydrogen gas, and allows the hydrogen gas to electrochemically react with oxygen to generate electric energy. In contrast to the DMFC, the PEMFC is typically in need of a reformer.

Hereinafter, the fuel cell system employing the DMFC will be representatively described. However, the fuel cell system according to the present invention is not limited to the DMFC, and may also be applied to the PEMFC.

In the embodiment shown in FIG. 1, when the fuel from the fuel feeder and the air taken in by the air pump 20 are supplied to the stack 6, the hydrogen gas electrochemically reacts with oxygen in the air in the stack 6, thereby generating the electric energy.

As shown in FIGS. 1-4, the stack 6 in the fuel cell system includes the electricity generator 11 used as an elementary unit of the fuel cell. The electricity generator 11 includes the separators 16 and the MEA 12 interposed between the separators 16. Thus, a plurality of electricity generators 11 are serially stacked to form the stack 6 as the aggregation of electricity generators 11.

The MEA 12 interposed between the separators 16 includes an anode and a cathode (not shown) at opposite sides thereof, and a membrane electrode between the anode and the cathode.

Here, the anode is used for oxidizing the hydrogen gas supplied through the separator 16, so that a hydrogen atom is broken down into a hydrogen ion (proton) and an electron. Further, the cathode is used for reacting oxygen in the air supplied through the separator 16 with the hydrogen ion and the electron transferred from the anode so as to be reduced, thereby generating heat and water. The membrane electrode is formed by a solid polymer electrolyte having a thickness of 50~200 μm, and functions as an ion exchange membrane to transfer the hydrogen ion from the anode to the cathode.

Further, the separators 16 are closely attached to the MEA 12 between them. In the embodiment shown, the separators 16 are located on opposite sides of the MEA 12, and formed with a fuel passage 16a and an air passage (not shown), respectively.

Here, the fuel passage 16a is disposed facing the anode of the MEA 12, and supplies the fuel to the anode. Further, the air passage, substantially an oxygen passage, is disposed facing the cathode of the MEA 12, and supplies oxygen in the air from the air pump 20 to the cathode.

The manner in which the fuel and the air are circulated through the fuel passage 16a and the air passage, respectively, are well known in the art, and detailed descriptions thereof are therefore omitted in this specification. The fuel and the air may be circulated through the fuel passage 16a and the air passage in any appropriate manner, as will be readily understood by one skilled in the art.

The separator 16 is made of graphite or carbon composite and molded to form the fuel passage 16a and the air passage. Alternatively, the separator 16 can be formed by pressing a metal plate made of one or more metals selected from a group consisting of aluminum, copper, iron, nickel and cobalt, or alloys thereof, to form the fuel passage 16a and the air passage.

In one embodiment, the separator 16 is manufactured by pressing the metal plate using a pair of press machines with sizes corresponding to the separator 16. Alternatively, the separator 16 may be manufactured by injection molding or die casting.

The separator 16 may also be manufactured by injection or extrusion molding a material having lower conductivity than a general carbon material, or a nonconductive material such as a ceramic, polymer, synthetic resin, rubber, etc.

The stack 6 includes a terminal (not shown) allowing the electrons generated in the MEA 12 to flow, and a connection structure to electrically connect each electricity generator 11 with one neighboring electricity generator 11, so that the neighboring electricity generators 11 in the stack 6 are electrically connected in series. Here, the terminal and the connection structure can be achieved by any suitable configuration, as will be readily understood by one of skill in the art. Detailed descriptions of these configurations will therefore be omitted.

The stack 6 further includes first and second collecting plates 22 and 24 placed at the outermost sides thereof, the collecting plates having different electric polarities. The plates therefore collect electricity generated in the stack 6. Here, the first and second collecting plates 22 and 24 are insulated from the outmost separators 16 by a separate insulating film (not shown).

The collecting plates 22 and 24 are closely attached to the outmost separators 16, and press the plurality of electricity generators 11 therebetween. Thus, the collecting plates 22 and 24 are coupled together by a separate coupling mechanism. For example, the coupling mechanism can be achieved by a bolt and a nut, a rivet, etc. In the embodiment shown, the coupling mechanism is achieved by a plurality of first and second bolts 31 and 33 and a plurality of first and second nuts 51 and 53.

At least four bolts 31, 33 are provided at upper, lower, left and right positions of the collecting plates 22 and 24. In this embodiment, two upper bolts and two lower bolts are provided at the upper and lower positions of the collecting plates 22 and 24, but the invention is not limited thereto.

Figure 2:
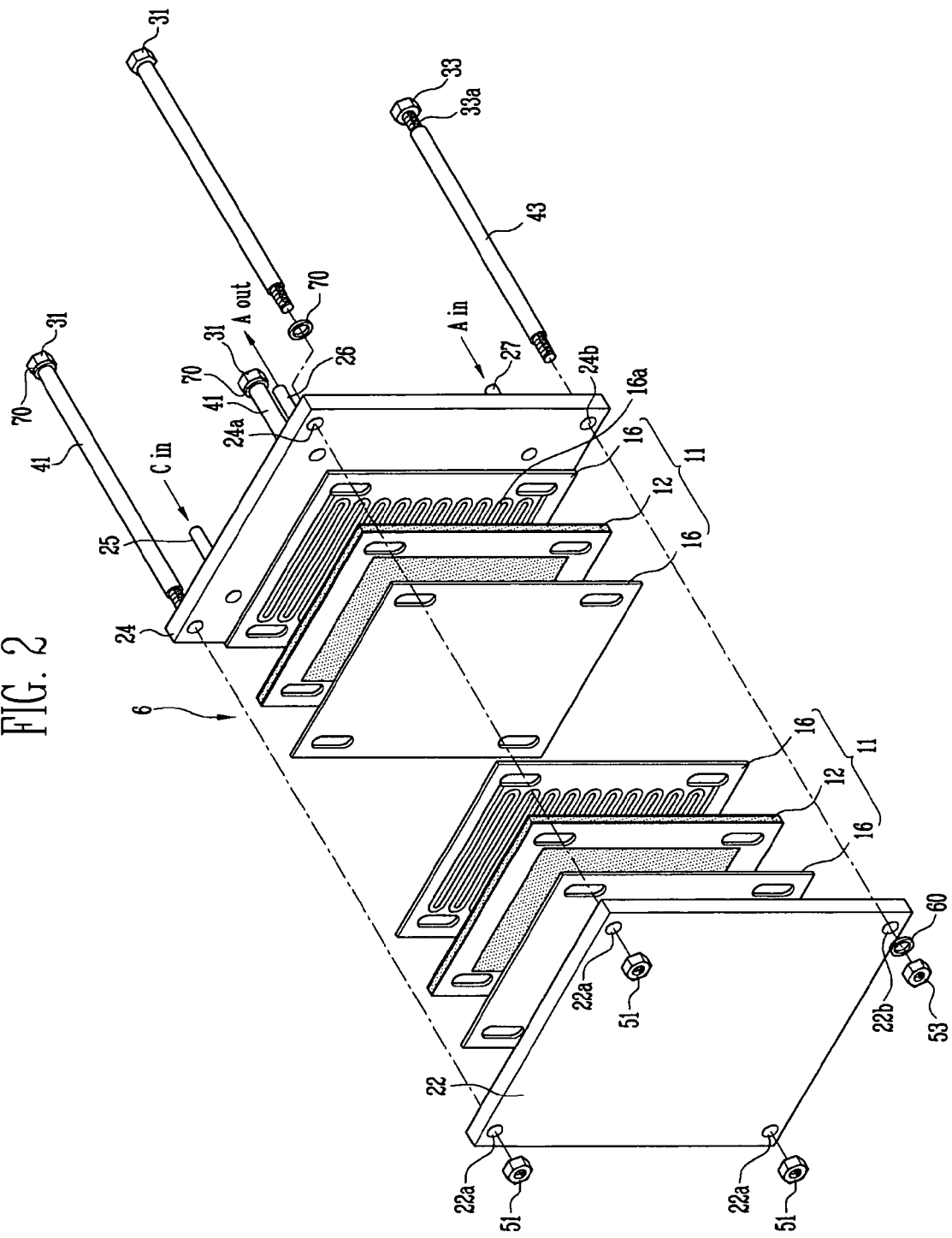
FIG. 2 is an exploded perspective view of a stack in the fuel cell system according to the embodiment shown in FIG. 1.
Figure 3:
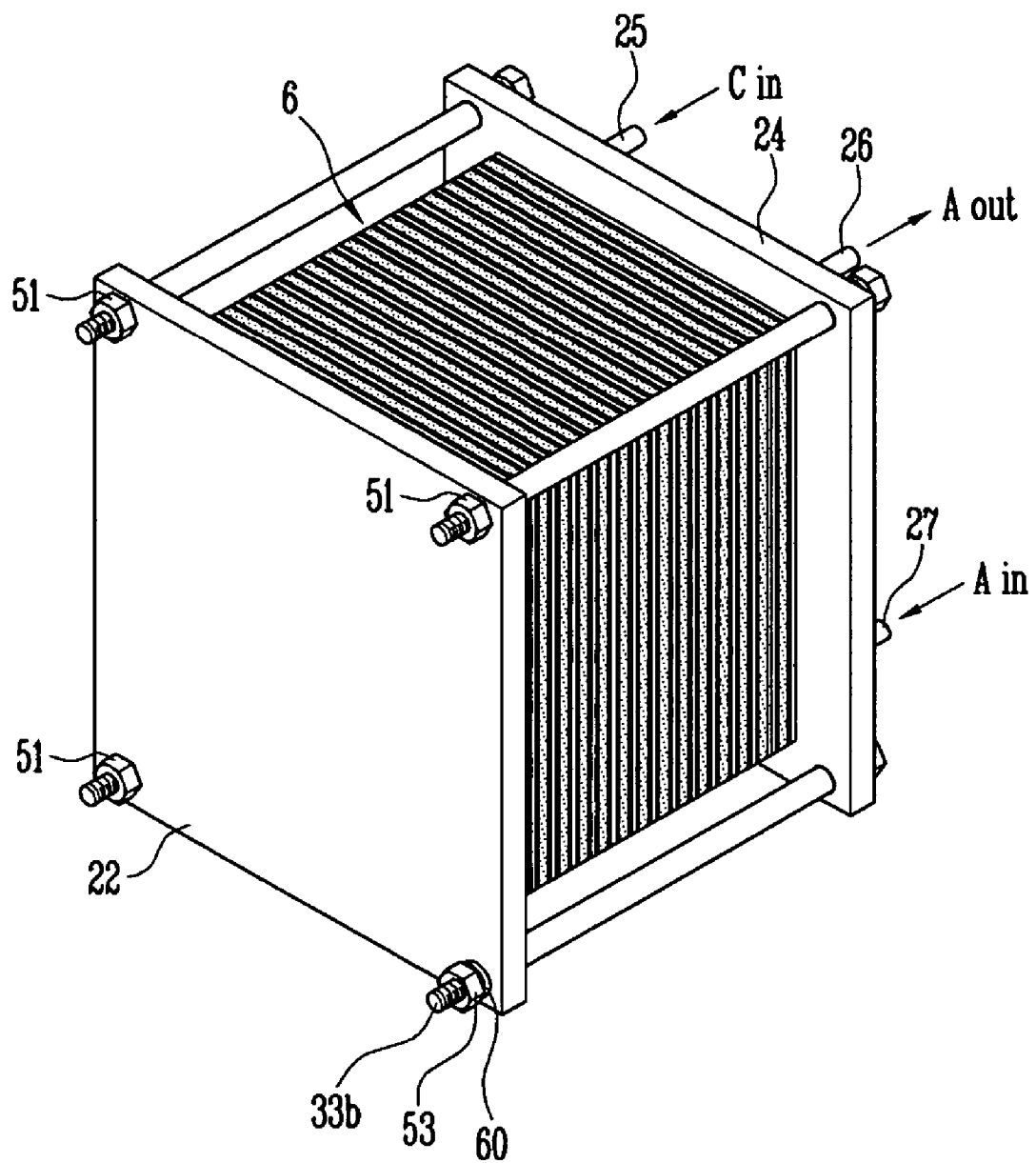
FIG. 3 is an assembled perspective view of the stack shown in FIG. 2.
Figure 4:
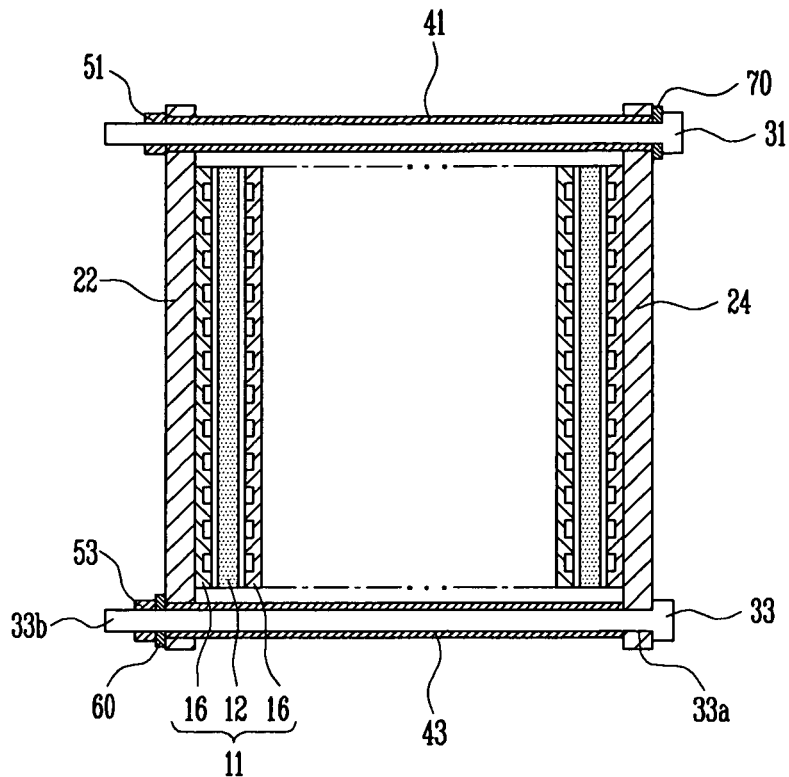
FIG. 4 is a cross-sectional view of the stack shown in FIG. 3.

As shown in FIGS. 2, 3 and 4, the bolts 31, 33 are inserted into the electricity generator 11 at the upper and lower positions of the electricity generator 11 from outside of the stack to directly couple the first and second collecting plates 22 and 24 with each other. The bolts 31, 33 press the electricity generator 11 such that the coupling is airtight.

In this embodiment, the coupling mechanism is employed as a terminal. The terminal in the stack 6 is electrically connected to the first collecting plate 24 and electrically insulated from the second collecting plate 22. That is, the terminal is electrically connected to the first collecting plate 24 and has the same electric polarity as the first collecting plate 24. In this embodiment, the coupling mechanism is employed as the terminal.

In other words, one of the bolts 33, hereinafter referred to as the "first bolt", is electrically connected to the first collecting plate 24, and electrically insulated from the second collecting plate 22, thereby having the same electric polarity as the first collecting plate 24.

In more detail, the first bolt 33 is coupled to a coupling hole 24b formed on the first collecting plate 24 and a coupling hole 22b formed on the second collecting plate 22. In this case, the first bolt 33 has a contact portion 33a to electrically contact the coupling hole 24b of the first collecting plate 24, and the coupling hole 22b of the second collecting plate 22 is coated with an insulating film 43 to be electrically insulated from the first bolt 33.

As shown in FIGS. 2, 3 and 4, the first bolt 33 can be entirely coated with the insulating film 43 except the contact portion 33a corresponding to the coupling hole 24b of the first collecting plate 24, so that the first bolt 33 can have the same electric polarity as the first collecting plate 24. Here, the end 33b of the first bolt 33 is not coated with the insulating film 43, so that it can be used as the terminal.

Thus, the first bolt 33, which is entirely coated with the insulating film 43 except the contact portion 33a corresponding to the coupling hole 24b of the first collecting plate 24 and the end 33b thereof, is electrically connected to the first collecting plate 24 and electrically insulated from the second collecting plate 22, thereby functioning as an external terminal.

As a variation in this embodiment, the first bolt 33 can be integrally formed on the first collection plate 24. In this case, the bolt integrally formed on the first collecting plate 24 can function as the external terminal having the same electric polarity as the first collecting plate 24, like the embodiment shown.

A separate insulating member may be interposed between the first bolt 33 and the second collecting plate 22 in order to better insulate the first bolt 33 from the second collecting plate 22.

In this embodiment, the insulating member is an insulating washer 60 on the end 33b of the first bolt 33. In this case, the insulating washer 60 is interposed between the nut 53 and the second collecting plate 22 when the first bolt 33 is coupled with the nut 53, so that the first bolt 33 and the second collecting plate 22 are better insulated from each other. Here, the washer 60 can be made of any insulating material, as will be readily understood by one skilled in the art.

In this embodiment, the bolts 31 other than the first bolt 33, hereinafter referred to as "second bolts", are entirely coated with an insulating film 41 except at the ends thereof, which are coupled with nuts 51 and coupling holes 22a. Here, the second bolts 31 are coated with the insulating film 41 even at the contact portions corresponding to the coupling holes 24a of the first collecting plate 24.

Here, separate insulating members are interposed between the second bolts 31 and the first collecting plate 24 in order to better insulate the second bolts 31 from the first collecting plate 24.

For example, the insulating members may be insulating washers 70 on the end of the second bolts 31. In this case, the insulating washers 70 are interposed between the second bolts 31 and the first collecting plate 24, so that the second bolts 31 and the first collecting plate 24 are better insulated from each other.

The first and second collecting plates 22 and 24 may be made of an aluminum material coated with a high conductive material such as gold, silver, copper, etc., but the material is not limited thereto.

The stack 6 according to this embodiment of the present invention includes a fuel supplying pipe 27 to supply the fuel to the anode through the fuel pump 3, a discharging pipe 26 to discharge the fuel incompletely reacted in the stack 6, an air supplying pipe 25 to supply oxygen to the cathode through the air pump 20, etc., which are provided on the first collecting plate 24. Thus, the fuel and oxygen are injected and discharged in one side, and react with each other as described above.

In the stack 6 with this configuration, the first bolt 33 protrudes from the second collecting plate 22, so that the first bolt 33 is used as (+) or (−) terminal on the second collecting plate 22.

Figure 5:
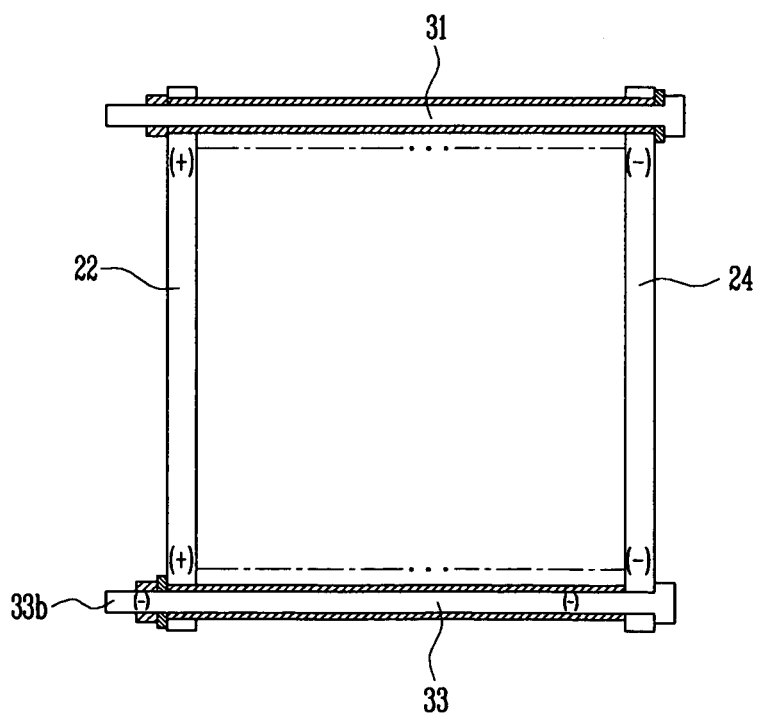
FIG. 5 is a schematic cross-sectional view showing the electric polarity of the stack shown in FIG. 4.

As shown in FIG. 5, in the case where the first collecting plate 24 has (−) polarity and the second collecting plate 22 has (+) polarity, the first bolt 33 is electrically connected with the first collecting plate 24 but insulated from the second collecting plate 22 by the insulating film 43, so that the first bolt 33 has the same (−) polarity as the first collecting plate 24. Thus, the end 33b of the first bolt 33 can be used as the (−) terminal.

Figure 6:
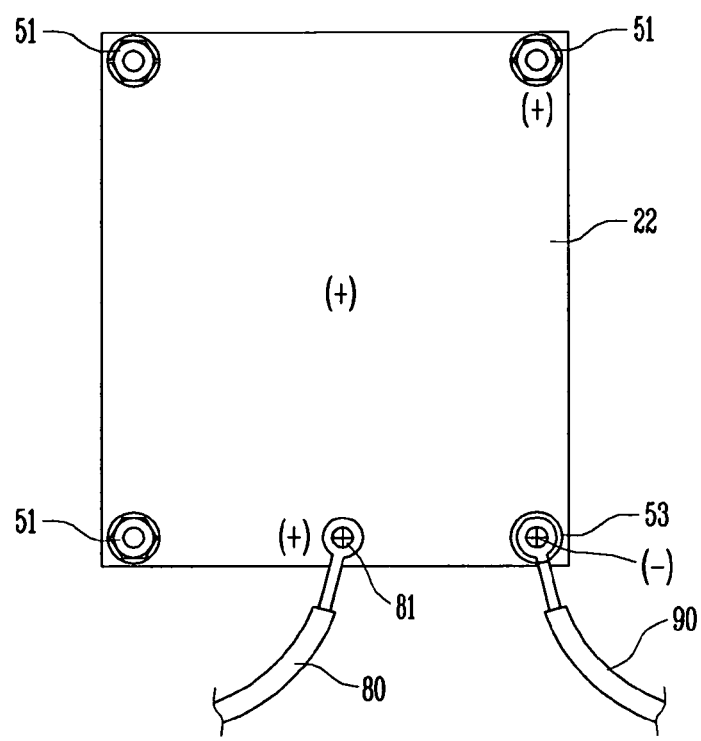
FIG. 6 is a plan view illustrating the terminal connection structure of the stack according to the embodiment shown in FIGS. 1-5.

In the embodiment shown in FIG. 6, the second collecting plate 22 has the (+) polarity, and a wiring line 80 is connected to the second collecting plate 22 by a screw 81. Thus, the second collecting plate 22 can be used as the external (+) terminal.

Figure 7:
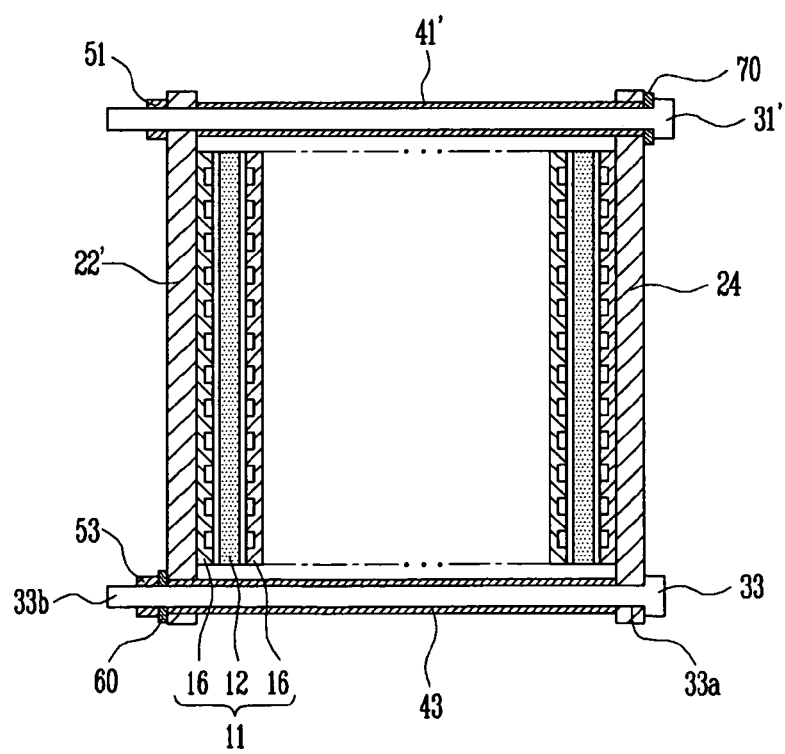
FIG. 7 is a cross-sectional view of a stack in a fuel cell system according to another embodiment of the present invention.
Figure 8:
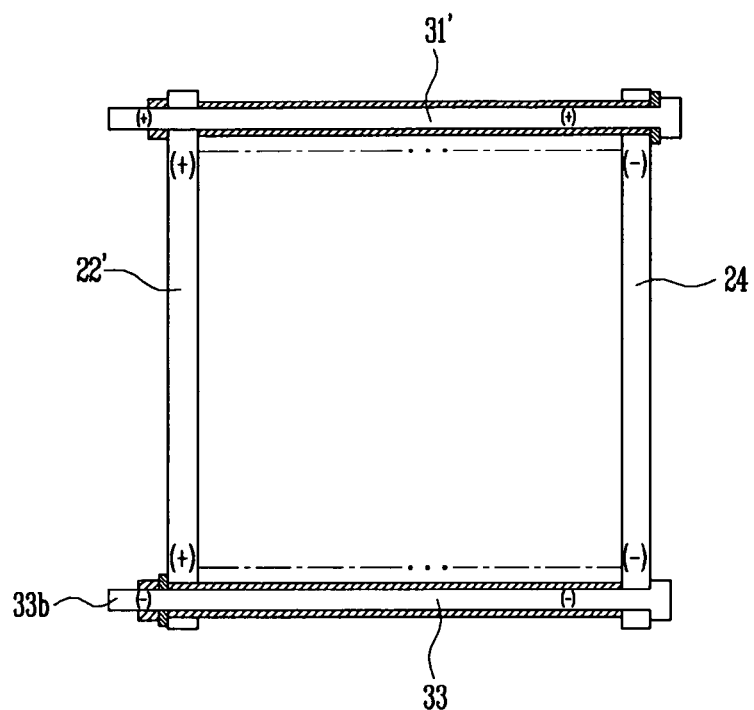
FIG. 8 is a schematic cross-sectional view showing the electric polarity of the stack shown in FIG. 7.
Figure 9:
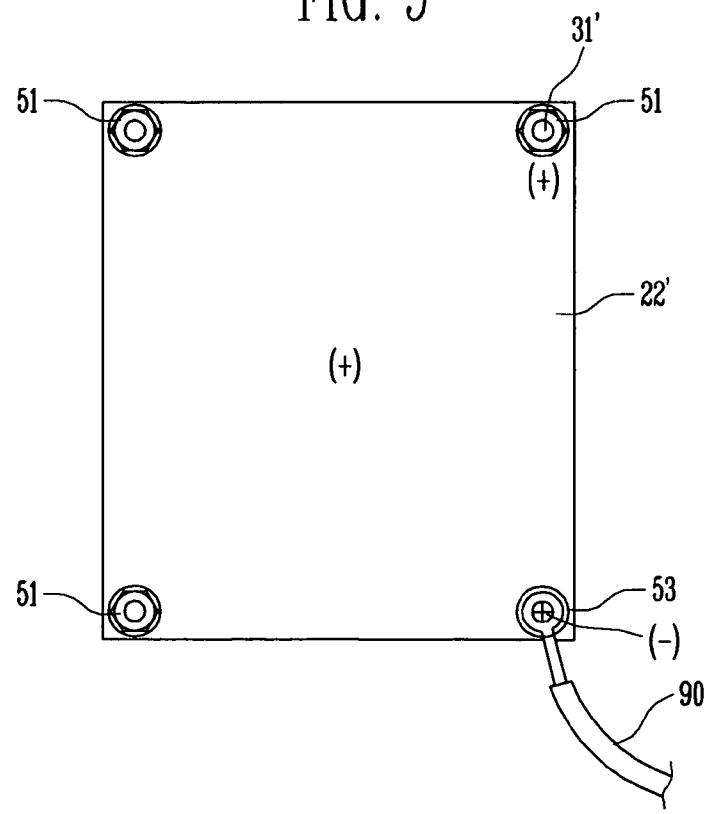
FIG. 9 is a plan view illustrating the terminal connection structure of the stack shown in FIGS. 7-8.

As an example of a variation in this embodiment, the contact portion of one of the second bolts 31' contacting the second collecting plate 22' is not coated with the insulating film 41' (referring to FIGS. 7 through 9), so that the second bolt 31' is electrically insulated from the first collecting plate 24 but electrically connected to the second collecting plate 22'. Thus, the second bolt 31' can be used as the (+) terminal.

That is, the first bolt 33 electrically connected to the first collecting plate 24 and insulated from the second collecting plate 22' is employed as the first terminal, and the second bolt 31' electrically connected to the second collecting plate 22' and insulated from the first collecting plate 24 is employed as the second terminal. Therefore, the (+) and (−) terminals can be placed on one side of the stack.

Figure 10:
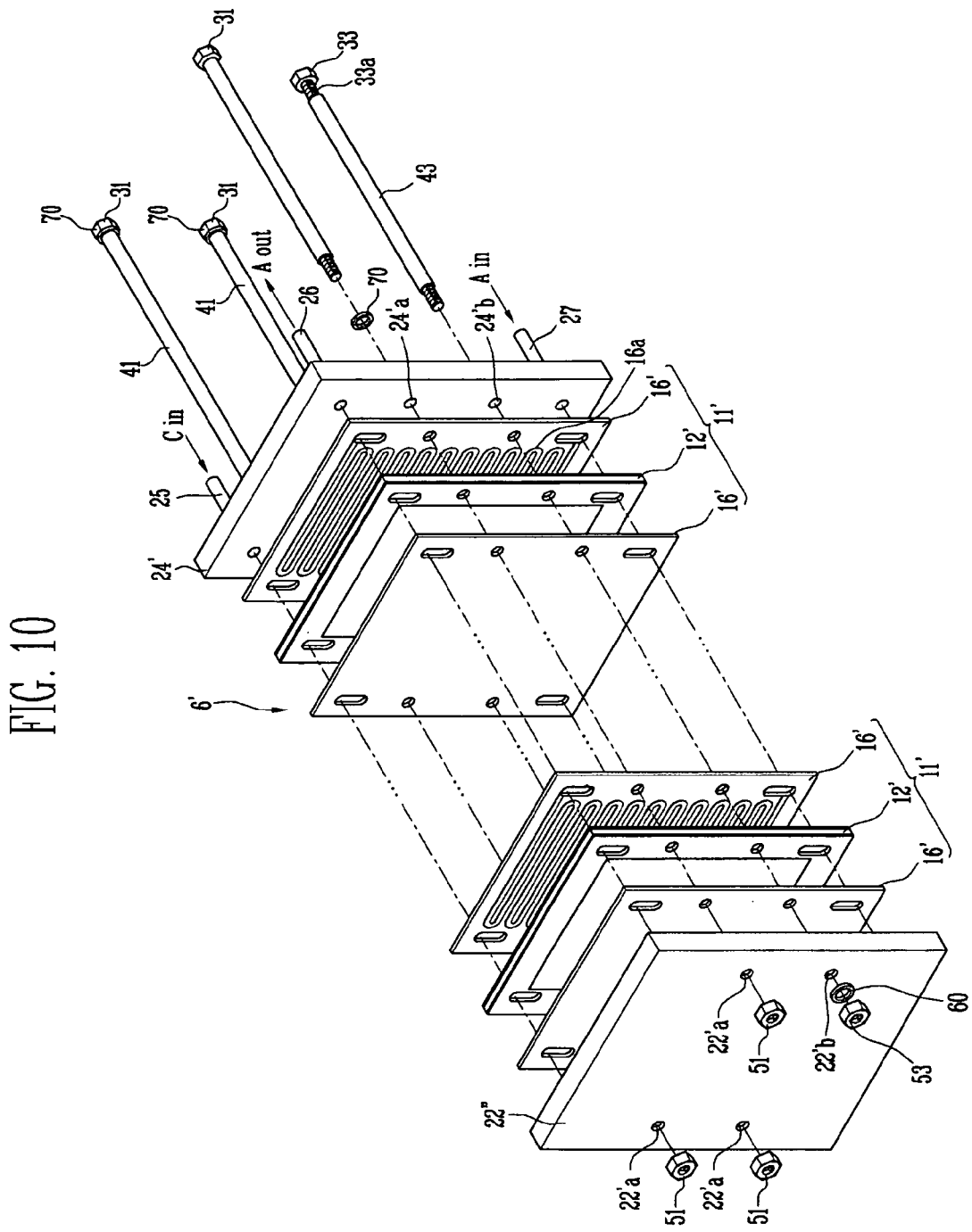
FIG. 10 is an exploded perspective view of a stack in fuel cell system according to another embodiment of the present invention.
Figure 11:
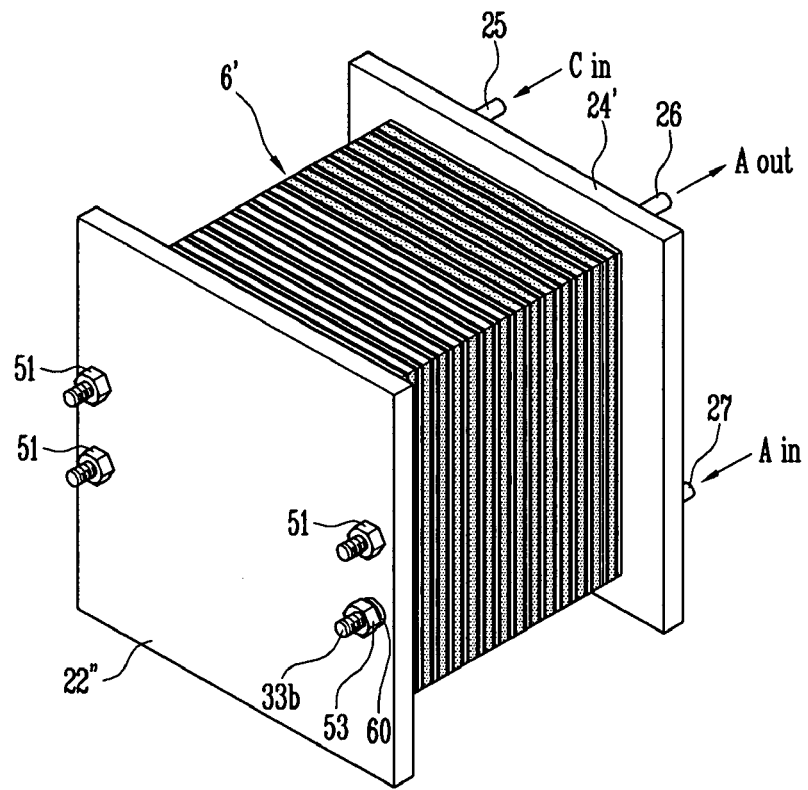
FIG. 11 is an assembled perspective view of the stack shown in FIG. 10.
Figure 12:
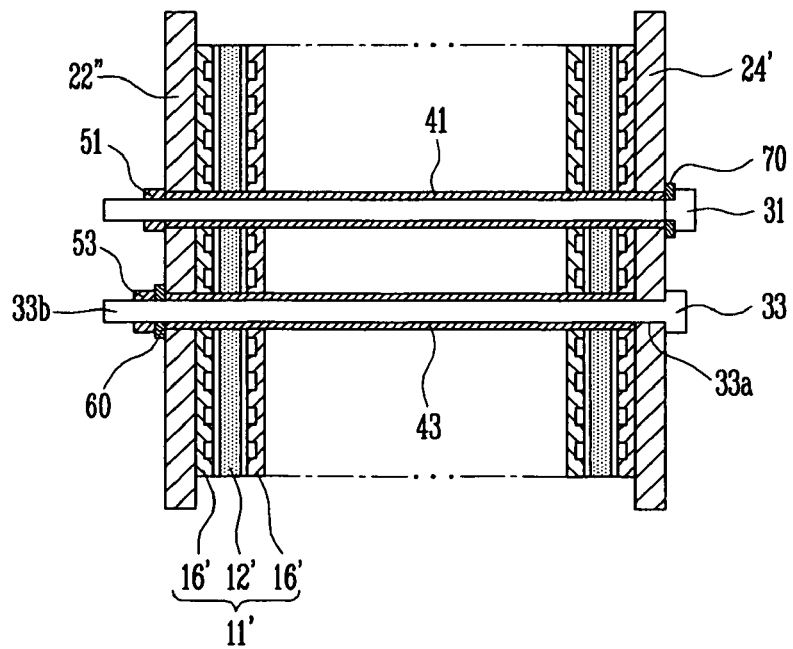
FIG. 12 is a cross-sectional view of the stack shown in FIG. 11.

As shown in FIGS. 10-12, according to another embodiment of the present invention, first and second collecting plates 22" and 24' with different electric polarities are placed on the outermost sides of a stack 6' to collect electricity generated in the stack 6'. Such collecting plates 22" and 24' are closely attached to the outermost separators 16', thereby pressing the electricity generators 11' located between the collecting plates 22" and 24'.

Here, the collecting plates 22" and 24' are coupled by a separate coupling mechanism. For example, the coupling mechanism can be achieved by a bolt and a nut, a rivet, etc. In this embodiment, the coupling mechanism is achieved by a plurality of bolts 31, 33 and a plurality of nuts 51, 53.

According to this embodiment of the present invention, the bolts 31, 33 penetrate the first and second collecting plates 22" and 24' and the electricity generator 11', thereby pressing the electricity generators 11' such that the connection is airtight.

While penetrating the electricity generators 11', the bolts 31, 33 are coated with insulating films 41, 42 in the penetrating portion thereof, thereby preventing the bolts 31, 33 from being short-circuited by the electricity generated in the electricity generators 11'.

In the stack 6' according to this embodiment of the present invention, the coupling mechanism is employed as a terminal electrically connected with the first collecting plate 24' and having the same electric polarity as the first collecting plate 24'.

In other words, one of bolts 33 (referred to again as the first bolt) is electrically connected to the first collecting plate 24', and electrically insulated from the second collecting plate 22", thereby having the same electric polarity as the first collecting plate 24'.

In more detail, the first bolt 33 is coupled to a coupling hole 24'b formed on the first collecting plate 24' and a coupling hole 22'b formed on the second collecting plate 22". In this case, the first bolt 33 is coated with the insulating film 43 except the contact portion 33a corresponding to the coupling hole 24'b of the first collecting plate 24'. That is, the portion of the first bolt 33 penetrating the electricity generators 11' and the portion thereof to contact the coupling hole 22'b of the second collecting plate 22" are coated with the insulating film 43. Here, the end 33b of the first bolt 33 is not coated with the insulating film 43, and functions as the terminal.

Thus, the first bolt 33, which is entirely coated with the insulating film 43 except the contact portion 33a corresponding to the coupling hole 24'b of the first collecting plate 24' and the end 33b thereof, is electrically connected to the first collecting plate 24' and insulated from the second collecting plate 22", thereby functioning as an external terminal.

As a variation of this embodiment, the first bolt 33 can be integrally formed on the first collection plate 24'.

In this case, the insulating film 43 should be coated on the entire surface of the first bolt except the end of the first bolt. Thus, the bolt integrally formed on the first collecting plate 24' can function as the external terminal having the same electric polarity as the first collecting plate 24', as described above.

In one embodiment, a separate insulating member is interposed between the first bolt 33 and the second collecting plate 22" in order to better insulate the first bolt 33 from the second collecting plate 22".

For example, the insulating member may be an insulating washer 60 to be put on the end 30b of the first bolt 33. In this case, the insulating washer 60 is interposed between the nut 53 and the second collecting plate 22" when the first bolt 33 is coupled with the nut 53, so that the first bolt 33 and the second collecting plate 22" are better insulated from each other.

Here, the washer 60 is made of a typical insulating material, and there is no limit to the material of the washer 60.

The bolts 31 other than the first bolt 33 (again referred to as the "second bolts") may be entirely coated with the insulating film 41 except the ends thereof to be coupled with the nuts 51 and coupling holes 22'a. Therefore, as discussed above in relation to FIGS. 1-6, the second bolts 31 are insulated from the first collecting plate 24' even at the contact portions corresponding to the coupling holes 24'a of the first collecting plate 24' and prevented from being short-circuited by the electricity generated in the electricity generators 11'.

Here, a separate insulating member is interposed between the second bolts 31 and the first collecting plate 24' in order to better insulate the second bolts 31 from the first collecting plate 24'.

For example, the insulating member can be achieved by an insulating washer 70 to be put on the end of the second bolt 31. In this case, the insulating washer 70 is interposed between the second bolt 31 and the first collecting plate 24', so that the second bolt 31 and the first collecting plate 24' are better insulated from each other.

The first and second collecting plates 22" and 24' may be made of an aluminum material coated with gold, silver, or copper, etc., but the invention is not limited thereto.

The stack 6' according to this embodiment of the present invention includes a fuel supplying pipe 27 to supply the fuel to the anode through the fuel pump 3, a discharging pipe 26 to discharge the fuel incompletely reacted in the stack 6', an air supplying pipe 25 to supply oxygen to the cathode through the air pump 20, etc., which are provided on the first collecting plates 24'. Thus, the fuel and oxygen react with each other as described above.

In the stack 6' with this configuration, the first bolt 33 protrudes from the second collecting plate 22", so that the first bolt 33 is used as a (+) or (−) terminal on the second collecting plate 22".

Figure 13:
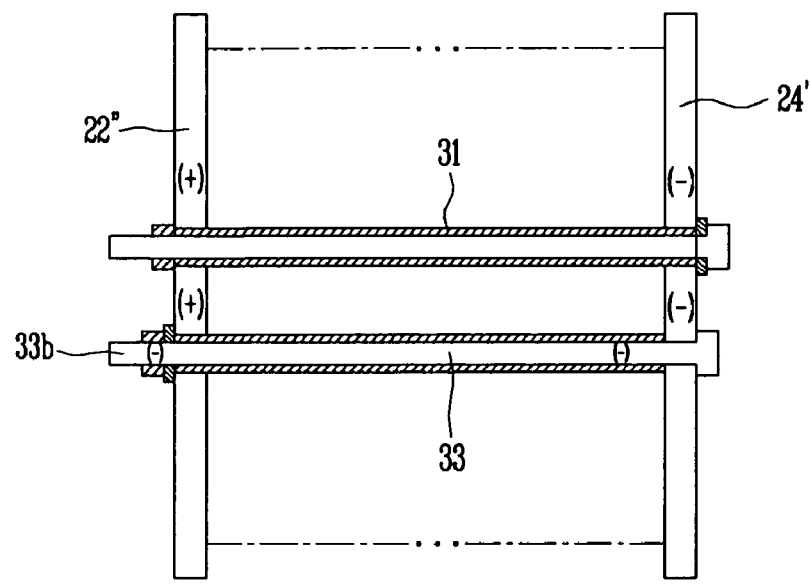
FIG. 13 is a schematic cross-sectional view showing the electric polarity of the stack shown in FIG. 12.

FIG. 13 shows electric polarity of the stack 6' according to this embodiment of the present invention. In the case where the first collecting plate 24' has (−) polarity and the second collecting plate 22" has (+) polarity, the first bolt 33 is electrically connected with the first collecting plate 24' but insulated from the second collecting plate 22" by the insulating film 43, so that the first bolt 33 has the same (−) polarity as the first collecting plate 24'.

Thus, the end 33b of the first bolt 33 can be used as the (−) terminal.

Figure 14:
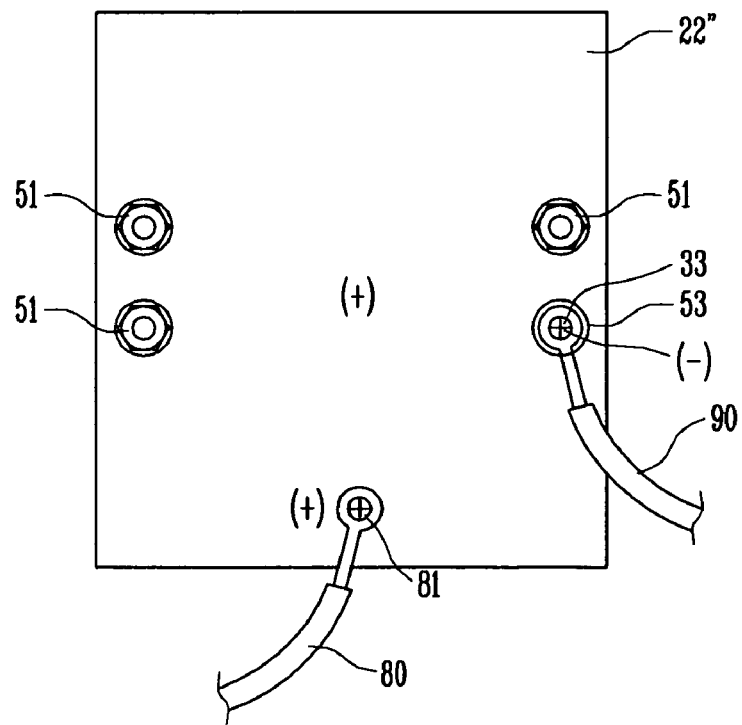
FIG. 14 is a plan view illustrating a terminal connection structure of the stack shown in FIGS. 10-13.

As shown in FIG. 14, the second collecting plate 22" has the (+) polarity, and a wiring line 80 is connected to the second collecting plate 22" by a screw 81. Thus, the second collecting plate 22" can be used as the external (+) terminal.

Further, the first bolt 33 has the same (−) polarity as the first collecting plate 24', so that the first bolt 33 can be used as the (−) terminal to which a wiring line 90 is connected.

The fuel cell system with this configuration according to the above-described embodiments of the present invention is operated as follows.

First, the fuel pump 3 is driven to supply the fuel stored in the fuel tank 1 to the electricity generators 11, 11' of the stack 6, 6'. At the same time, the air pump 20 is driven to supply the air to the electricity generators 11, 11'.

Each electricity generator 11, 11' generates an electric current due to movement of electrons. Then, the electric energy having predetermined electric potential can be applied to a portable device such as a notebook personal computer, a PDA, or the like through the collecting plates 22, 22', 22" and 24, 24' placed in the outmost sides of the stack 6, 6'.

As described above, in the fuel cell system according to the above-described embodiments of the present invention, the terminals are placed in one side of the stack to facilitate wiring, and an electric connection structure is improved to thereby enhance the performance of a fuel cell.

Further, the volume of the stack decreases to reduce the size of a fuel cell, thereby making the fuel cell system be compact.

While the invention has been described in connection with certain exemplary embodiments, it is to be understood by those skilled in the art that the invention is not limited to the disclosed embodiments, but, on the contrary, is intended to cover various modifications included within the sprit and scope of the appended claims and equivalents thereof.

What is claimed is:

1. A stack for a fuel cell, comprising:
a first collecting plate having a first electric polarity;
a second collecting plate having a second electric polarity different from the first electric polarity;
at least one electricity generator located between the first collecting plate and the second collecting plate, the at least one electricity generator for generating electric energy due to electrochemical reaction between hydrogen and oxygen to be collected by the first collecting plate and the second collecting plate;
coupling members pressing the at least one electricity generator in an airtight connection between the first collecting plate and the second collecting plate;
a terminal member protruding from the second collecting plate, the terminal member electrically connected to the first collecting plate and insulated from the second collecting plate, such that the terminal member is used as a first terminal having the first polarity; and
a second terminal located on a same side of the stack as the first terminal and having the second electric polarity,
wherein the terminal member comprises one of the coupling members.

2. The stack according to claim 1, wherein the second collecting plate is used as the second terminal.

3. The stack according to claim 1, wherein the terminal member is integrally formed on the first collecting plate, and is coupled to edges of a coupling hole formed in the second collecting plate with an insulating film coating interposed therebetween.

4. The stack according to claim 3, further comprising an insulating member interposed between the terminal member and the second collecting plate.

5. The stack according to claim 3, wherein the terminal member penetrates the at least one electricity generator and is coated with an insulating film in a portion thereof penetrating the at least one electricity generator.

6. The stack according to claim 1, wherein the terminal member is coupled to an edge of a coupling hole in the first collecting plate and an edge of a coupling hole in the second collecting plate, and wherein an insulating film coating is interposed between the terminal member and the edge of the coupling hole in the second collecting plate.

7. The stack according to claim 6, further comprising an insulating member interposed between the terminal member and the second collecting plate.

8. The stack according to claim 6, wherein the terminal member penetrates the at least one electricity generator and is coated with an insulating film in a portion thereof penetrating the at least one electricity generator.

9. The stack according to claim 1, wherein the coupling members are provided on an outside of the at least one electricity generator to directly couple the first collecting plate with the second collecting plate.

10. The stack according to claim 1, wherein the coupling members comprise a bolt and a nut.

11. The stack according to claim 10, wherein the coupling members penetrate the first collecting plate, the second collecting plate, and the at least one electricity generator, and is coated with an insulating film.

12. The stack according to claim 11, further comprising an insulating member interposed between the coupling members and the first collecting plate.

13. The stack according to claim 1, wherein the first collecting plate, the second collecting plate, or both includes an aluminum material coated with one material selected from the group consisting of gold, silver and copper.

14. The stack according to claim 1, further comprising a screw fastened to the second collecting plate and a wiring line connected to the screw, such that the second collecting plate functions as an external terminal.

15. The stack according to claim 1, further comprising a second terminal member electrically connected to the second collecting plate and insulated from the first collecting plate, wherein the second terminal member protrudes from the second collecting plate and is used as the second terminal.

16. The stack according to claim 15, wherein the second terminal member comprises another one of the coupling members.

17. The stack according to claim 16, wherein the coupling members comprise a bolt and a nut.

18. A fuel cell system comprising:
a stack to generate electric energy due to electrochemical reaction between hydrogen and oxygen, the stack comprising:
a first collecting plate having a first electric polarity;
a second collecting plate having a second electric polarity different from the first electric polarity;
at least one electricity generator located between the first collecting plate and the second collecting plate, the at least one electricity generator for generating electric energy due to electrochemical reaction between hydrogen and oxygen to be collected by the first collecting plate and the second collecting plate;
coupling members pressing the at least one electricity generator in an airtight connection between the first collecting plate and the second collecting plate;
a terminal member electrically connected to the first collecting plate and insulated from the second collecting plate, the terminal member protruding from the second collecting plate and used as a first terminal having the first electric polarity; and
a second terminal located on a same side of the stack as the first terminal and having the second electric polarity,
wherein the terminal member comprises one of the coupling members;
a fuel feeder to supply fuel containing hydrogen to the stack;
fuel supplying and discharging pipes adapted to supply the fuel to the at least one electricity generator through the fuel feeder, and to discharge the fuel incompletely reacted in the stack;
an oxygen feeder adapted to supply an oxidizing agent containing oxygen to the stack; and
oxidizing agent supplying and discharging pipes adapted to supply and discharge an oxidizing agent to the at least one electricity generator through the oxygen feeder,
wherein the fuel supplying and discharging pipes and the oxidizing agent supplying and discharging pipes are provided on the first collecting plate.

19. The fuel cell system according to claim 18, wherein the second collecting plate is used as the second terminal.

20. The fuel cell system according to claim 18, wherein the terminal member is integrally formed on the first collecting plate, and is coupled to edges of a coupling hole formed in the second collecting plate with an insulating film coating interposed therebetween.

21. The fuel cell system according to claim 20, further comprising an insulating member interposed between the terminal member and the second collecting plate.

22. The fuel cell system according to claim 20, wherein the terminal member penetrates the at least one electricity generator and is coated with an insulating film in a portion thereof penetrating the electricity generator.

23. The fuel cell system according to claim 18, wherein the terminal member is coupled to an edge of a coupling hole in the first collecting plate and an edge of a coupling hole in the second collecting plate, and wherein an insulating film coating is interposed between the terminal member and the edge of the coupling hole in the second collecting plate.

24. The fuel cell system according to claim 23, further comprising an insulating member interposed between the terminal member and the second collecting plate.

25. The fuel cell system according to claim 23, wherein the terminal member penetrates the at least one electricity generator and is coated with an insulating film in the portion thereof penetrating the electricity generator.

26. The fuel cell system according to claim 18, wherein the coupling members are provided on an outside of the at least one electricity generator to directly couple the first collecting plate with the second collecting plate.

27. The fuel cell system according to claim 18, wherein the coupling members comprise a bolt and a nut.

28. The fuel cell system according to claim 27, wherein the coupling members penetrate the first collecting plate, the second collecting plate, and the at least one electricity generator, and are coated with an insulating film.

29. The fuel cell system according to claim 28, further comprising an insulating member interposed between the coupling members and the first collecting plate.

30. The fuel cell system according to claim 18, wherein the collecting plate includes an aluminum material coated with one material selected from the group consisting of gold, silver and copper.

31. The fuel cell system according to claim 18, further comprising a screw fastened to the second collecting plate and a wiring line connected to the screw, such that the second collecting plate functions as an external terminal.

32. The fuel cell system according to claim 18, further comprising a second terminal member electrically connected to the second collecting plate and insulated from the first collecting plate,
wherein the second terminal member protrudes from the second collecting plate and is used as the second terminal.

33. The fuel cell system according to claim 32, wherein the second terminal member comprises another one of the coupling members.

34. The fuel cell system according to claim 33, wherein the coupling members comprise a bolt and a nut.

35. The fuel cell system according to claim 18, wherein the fuel feeder comprises a reformer to supply hydrogen gas to the at least one electricity generator.

36. A stack for a fuel cell, comprising:
a first collecting plate having a first electric polarity;
a second collecting plate having a second electric polarity different from the first electric polarity;
at least one electricity generator located between the first collecting plate and the second collecting plate, the at least one electricity generator for generating electric energy due to electrochemical reaction between hydrogen and oxygen to be collected by the first collecting plate and the second collecting plate;
coupling members pressing the at least one electricity generator in an airtight connection between the first collecting plate and the second collecting plate;
a terminal member protruding from the second collecting plate, the terminal member electrically connected to the first collecting plate and insulated from the second collecting plate, such that the terminal member is used as a first terminal having the first polarity; and
a second terminal located on a same side of the stack as the first terminal and having the second electric polarity,
wherein the terminal member penetrates the at least one electricity generator and is coated with an insulating film in a portion thereof penetrating the at least one electricity generator.

* * * * *